United States Patent
Zolna et al.

(10) Patent No.: US 11,164,025 B2
(45) Date of Patent: Nov. 2, 2021

(54) METHOD OF HANDWRITTEN CHARACTER RECOGNITION CONFIRMATION

(71) Applicant: ECOLE POLYTECHNIQUE FEDERALE DE LAUSANNE (EPFL), Lausanne (CH)

(72) Inventors: Konrad Zolna, Chrzanow (PL); Thibault Asselborn, Lausanne (CH); Wafa Johal, Randwick (AU)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 21 days.

(21) Appl. No.: 16/765,459

(22) PCT Filed: Nov. 24, 2017

(86) PCT No.: PCT/EP2017/080430
§ 371 (c)(1),
(2) Date: May 19, 2020

(87) PCT Pub. No.: WO2019/101338
PCT Pub. Date: May 31, 2019

(65) Prior Publication Data
US 2020/0285877 A1    Sep. 10, 2020

(51) Int. Cl.
*G06K 9/22* (2006.01)
*G06K 9/62* (2006.01)
*G06N 3/08* (2006.01)

(52) U.S. Cl.
CPC ............ *G06K 9/222* (2013.01); *G06K 9/623* (2013.01); *G06K 9/6256* (2013.01); *G06N 3/08* (2013.01); *G06K 2209/01* (2013.01)

(58) Field of Classification Search
CPC ........ G06T 2207/20081; G06T 7/0004; G06K 2209/01; G06K 9/6256
See application file for complete search history.

(56) References Cited

U.S. PATENT DOCUMENTS 6,092,043 A    7/2000    Squires et al.
6,445,820 B1    9/2002    Love
(Continued)

FOREIGN PATENT DOCUMENTS

CH    711674 A2    4/2017
CN    101004793 A    7/2007
(Continued)

*Primary Examiner* — Yosef Kassa
(74) *Attorney, Agent, or Firm* — Maschoff Brennan

(57) ABSTRACT

The present invention concerns a method for an artificial neural network to confirm the recognition of handwritten characters produced by a user. The method comprising: training the artificial neural network with a training data set comprising a first set of characters; collecting handwritten characters of a second set of characters produced by the user; and analysing the collected characters of the second set of characters by using the artificial neural network to obtain a first set of probability values comprising character specific probability values for the collected characters, each character specific probability value indicating the probability that the collected character has been correctly interpreted. The analysis considers at least the manner how the collected characters are handwritten and the appearance of the collected characters to obtain the character specific probability values. The invention also relates to a corresponding data processing apparatus.

15 Claims, 3 Drawing Sheets

(56) References Cited

U.S. PATENT DOCUMENTS

| | | |
|---|---|---|
| 6,454,706 B1 | 9/2002 | Pullman |
| 6,546,134 B1 | 4/2003 | Shrairman et al. |
| 6,622,575 B1 | 9/2003 | Nagata |
| 7,418,125 B2 * | 8/2008 | Miyashita ............ G06K 9/3233 382/151 |
| 7,418,128 B2 * | 8/2008 | Simard ................ G06K 9/6256 382/159 |
| 7,542,593 B1 * | 6/2009 | Chaurasia .......... G06K 9/00167 382/119 |
| 7,599,528 B1 * | 10/2009 | Chaurasia .......... G06K 9/00167 382/119 |
| 8,798,325 B2 * | 8/2014 | Wu ...................... G06K 9/3258 382/105 |
| 2005/0053269 A1 | 3/2005 | Franke et al. |
| 2007/0003142 A1 | 1/2007 | Simard et al. |
| 2007/0248267 A1 | 10/2007 | Bar-Av |
| 2007/0292030 A1 | 12/2007 | Geidl et al. |
| 2008/0159589 A1 * | 7/2008 | Benyoub ............. G06K 9/6857 382/101 |
| 2008/0260241 A1 | 10/2008 | Ye et al. |
| 2009/0324076 A1 | 12/2009 | Kolmykov-Zotov et al. |
| 2010/0134408 A1 | 6/2010 | Palsbo et al. |
| 2012/0065997 A1 | 3/2012 | Farooq et al. |
| 2014/0304200 A1 | 10/2014 | Wall |
| 2015/0235097 A1 | 8/2015 | Wang et al. |
| 2016/0247035 A1 | 8/2016 | Gross et al. |

FOREIGN PATENT DOCUMENTS

| | | |
|---|---|---|
| CN | 101295371 A | 10/2008 |
| CN | 101393645 A | 3/2009 |
| CN | 101464952 A | 6/2009 |
| CN | 101630362 A | 1/2010 |
| CN | 103093235 A | 5/2013 |
| CN | 103823989 A | 5/2014 |
| DE | 19615211 A1 | 10/1997 |
| EP | 0539740 A2 | 5/1993 |
| EP | 2352427 A1 | 8/2011 |
| JP | S6395591 A | 4/1988 |
| JP | H0962775 A | 3/1997 |
| RU | 2138987 C1 | 10/1999 |
| UA | 53741 U | 10/2010 |
| WO | 03067554 A1 | 8/2003 |
| WO | 2010052708 A1 | 5/2010 |
| WO | 2015059930 A1 | 4/2015 |
| WO | 2015175462 A1 | 11/2015 |

* cited by examiner

METHOD OF HANDWRITTEN CHARACTER RECOGNITION CONFIRMATION

TECHNICAL FIELD

The present invention relates to a method of confirming the recognition of handwritten characters. More specifically, the proposed method not only considers the appearance of these characters, but also the manner how these characters are produced. The invention also relates to a corresponding apparatus and system configured to carry out the method.

BACKGROUND OF THE INVENTION

Handwriting is a complex task involving cognitive, perceptual, attentional, linguistic, and fine motor skills. A major breakthrough in the understanding of handwriting has followed from the development, in the last decades, of graphic tablets and dedicated software programs, which enable high frequency sampling and subsequent analysis of handwriting dynamics. These tools greatly contributed to our current knowledge of handwriting kinematics and of the development of abilities for planning and controlling handwriting movements.

Until now, two main approaches have been used to confirm the recognition of handwriting. The first one is a global holistic approach which evaluates the handwriting quality as a whole, while the second one measures it according to several predefined criteria. The global holistic approach is used to give an overall judgment of the quality of handwriting by comparing it with handwriting samples previously sorted according to their quality. Assessment of the writing quality only relies on a subjective judgement made by a human-being. The second commonly used approach for handwriting legibility analysis is based on predefined criteria (e.g. letter form, letter size, spacing and line-straightness). The judgment is then made by grading individually all these criteria and summing all these sub-scores. However, the observation of all these criteria still remains partly subjective because the assessment is carried out by a human-being.

Thanks to the emergence of new tools (e.g. tablet computers), the addition of several variables (hidden so far) to the analysis of handwriting legibility has become possible. In particular, the analysis of dynamic features of handwriting enables a better overall analysis. Several techniques taking into account the dynamics of handwriting have been proposed to classify the handwriting legibility, thus leading to better accuracy and reduced subjectivity.

Since the emergence of machine learning, a lot of research has been conducted to generate models for handwriting analysis. Indeed, machine recognition of handwriting has been used in various fields, such as reading postal addresses on envelopes, amounts in bank checks or signature verification. Models are generally divided into offline and online recognition. In the offline recognition, models focus on the appearance (image) of the handwritten text, while in the online recognition, the location of a tip of a pen is followed as a function of time.

Offline systems are generally less accurate than online systems due to the absence of temporal data containing information that may be relevant for the model. Only the image of the handwritten text is available to the model. On the contrary, for the online recognition, the temporal information about handwriting is available to the model. Different architectures of models may then be used for the classification. Currently, many models exist to recognise characters, words or sentences. However, the current solutions are not able to satisfactorily assess handwriting legibility and thus to confirm the correctness of the character recognition.

SUMMARY OF THE INVENTION

It is an object of the present invention to overcome at least some of the problems identified above related to analysing handwriting and/or to confirming the recognition of handwritten characters.

According to a first aspect of the invention, there is provided a method of confirming the recognition of handwritten characters as recited in claim 1.

The proposed new solution has the advantage that the proposed method allows reliably confirming the correctness of handwritten characters. In other words, the characters analysed by the proposed method can be identified correctly with high accuracy. This is partly due to the fact that the dynamics of the handwriting is taken into account in the analysis. Furthermore, the analysis can be done quickly and the results are completely objective as the analysis is carried out by a data processing apparatus.

According to a second aspect of the invention, there is provided a data processing apparatus for carrying out the proposed method as recited in claim 12.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
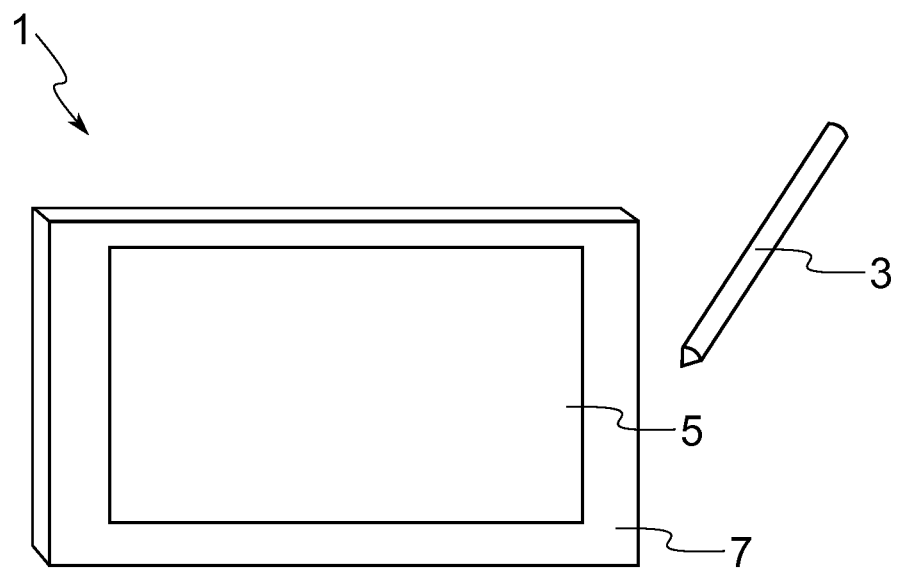
FIG. 1 is a simplified view of the data collection setting according to an example of the present invention.

An embodiment of the present invention will now be described in detail with reference to the attached figures. This embodiment is described in the context of confirming the recognition of one or more handwritten alphabet letters and numbers (which may give an indication how well they are written), but the teachings of the invention are not limited to this environment. The teachings of the invention are equally applicable in any system configured to confirm the correct recognition of any characters. In the present description, the word "character" is understood to cover any types of signs, glyphs or symbols, covering thus for example various alphabet letters and/or numbers but covering also a combination of individual symbols (words) even if they are separated by a word divider, such as a blank space (forming sentences). Identical or corresponding functional and structural elements which appear in the different drawings are assigned the same reference numerals.

FIG. 1 schematically illustrates a data collection system 1 or setting, which may be used to collect characters to be analysed or evaluated. In the present example, the characters to be analysed are handwritten characters, such as letters and/or numbers or (numerical) digits (i.e. numeric symbols), referred to collectively also as glyphs. In this example, these characters are produced by a human-being with a writing instrument 3, such as a pen or pencil. In this example system configuration, the characters are written on a piece of paper 5 directly placed on a sensitive surface, such as a touch screen surface (i.e. a tactile surface), of a data processing device or apparatus 7, such as a tablet computer. In this example, the data processing device is configured to carry out the proposed method.

Figure 2:
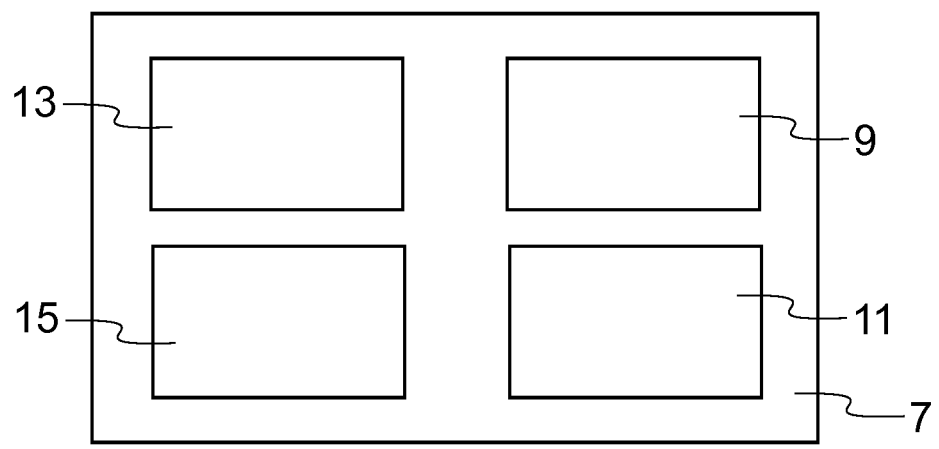
FIG. 2 is a simplified block diagram of a data processing device for carrying out the proposed method according to an example of the present invention.

FIG. 2 is a simplified block diagram of the data processing device 7. The data processing device 7 comprises a data collection unit 9 for sensing or collecting the characters produced by a user. The collected characters may then be saved or stored in a memory unit 11, also referred to as a memory, before they are analysed by a character analysis unit 13. The analysis results from the character analysis unit 13 may also be saved in the memory unit 11. The data processing device 7 also comprises a central processing unit 15 for centrally controlling the operation of the data processing device 7.

The present invention is based on an idea of using an artificial neural network (ANN) to analyse or evaluate handwritten characters produced by the user. The analysis results may then be used for example for training purposes to improve the user's handwriting. The results may also be used for example to reproduce digitally the characters input by the user once they have been properly analysed, i.e. interpreted optionally by imitating the handwriting style of the user. An ANN is a generic term describing mathematical objects and their programmable models, which execute calculations or computations by forwarding inputs through calculating layers of elements. The original inspiration for the ANNs is the structure of natural neurons and synapses connecting them. ANNs are used to find an approximation of a given function (relation) having a finite set of "input-output" pairs. The possible structures of these pairs vary from simple ones, such as "value-value" to very complex ones, such as in the present example (where an input is a set of characters collected for a given user and an output is a label or score). ANNs are particularly useful in situations where the relation between inputs and outputs is complex and hard to identify by a non-expert human-being.

An ANN is based on a collection of connected units known as artificial neurons or somas. Each connection, also referred to as a synapse, between neurons can transmit a signal to another neuron. The receiving neuron can process these signal(s) and then signal downstream neurons connected to it. Neurons may have a state, generally represented by real numbers, typically between zero and one. Neurons and synapses may also have a weight, which varies as learning proceeds, which can increase or decrease the strength of the signal that it sends forward. Furthermore, they may have a threshold such that the downstream signal is only sent if the aggregate signal is below or above that threshold. Typically, neurons are organised in layers. Different layers may perform different kinds of transformations on their inputs. Signals travel from the first (input), to the last (output) layer, possibly after traversing hidden layers between them once or multiple times. Practice has proven that ANNs may be successfully employed to solve various practical problems. They have been used in different applications, such as in machine translation, image recognition or even playing computer games.

The present example uses a recurrent neural network (RNN), and more specifically a long short-term memory (LSTM) RNN although the teachings of the present invention are not limited to RNNs. RNNs have been introduced to analyse and to interpret sequences of data. For this reason, it meets the present analysis setup, where each character may be understood as a trajectory, i.e. a sequence of consecutive positions of the tip of the writing instrument on the paper 5 (or on another surface). The proposed method takes into account the temporal aspect of data and thus considers the dynamics of writing. Contrary to many existing character analysis or recognition methods relying merely on the static final character (image), the present method considers not only the final static character, but also the manner this character has been produced, i.e. the dynamics of writing. It is to be noted that certain characters may look very similar if only the final trace is inspected. This is for example the case between the letter "e" and the letter "l" or between the letter "g" and the number "9". Thus, our hypothesis is that the final trace is sometimes not enough to distinguish between these characters and in these cases the dynamics of the handwriting is important. An RNN is a class of artificial neural network, where connections between nodes (neurons) form a directed cycle. This allows it to consider dynamic temporal behaviour. Unlike feedforward neural networks for example, RNNs can use their internal memory to process arbitrary sequences of inputs. This makes them suitable for tasks such as unsegmented, connected handwriting recognition or speech recognition.

Figure 3:
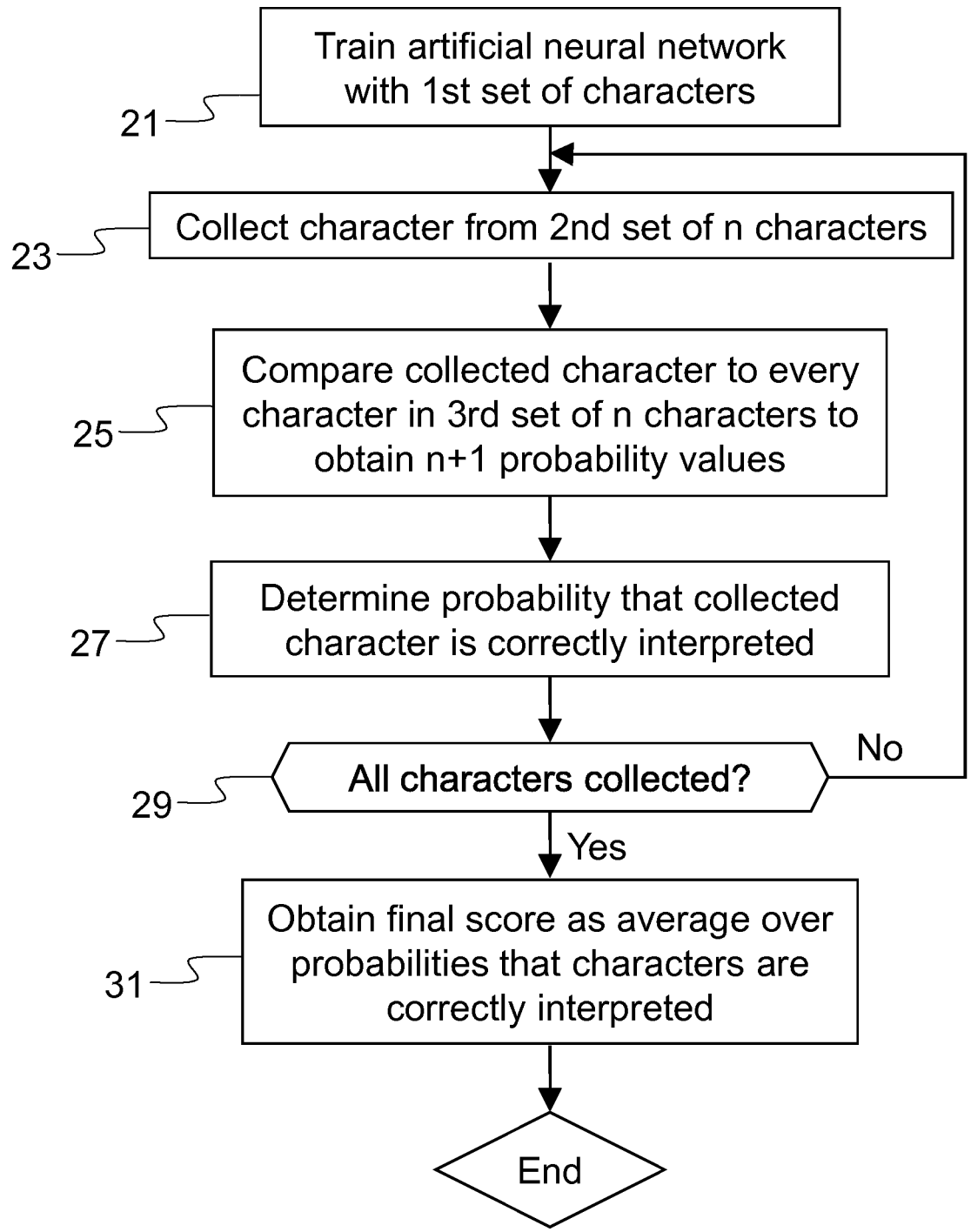
FIG. 3 is a flow chart summarising the proposed character analysis method according to an example of the present invention.

With reference to the flow chart of FIG. 3, the proposed method, which relies on a neural network considering dynamic features of handwriting to confirm the recognition of handwritten characters, is next explained in more detail. In step 21, the neural network, which in this example is the RNN, is trained with data samples from a first data set comprising a first set of characters. The first data set can be divided into a first data subset, referred to as a training data set, and a second data subset, referred to as a test data set or validation set. In this example, the training data set represents 80% of the data samples of the first data set, while the test data set represents 20% of the data samples of the first data set. In order to give more statistical power to the learning procedure, a k-fold cross validation may be used for the learning procedure. In this way, it is possible to have an idea how reliable/stable the results are by comparing the results obtained by using k different training models. A k-fold (with k=5 for example) cross-validation was performed for the training. For each fold, the ratio between the training data set size and test data set size was fixed to 80%-20%. Since k was set to 5 and 20% of the data were used for the test in each run, every sample giver in the database was used in the test set exactly once. The data samples of the first data set comprise characters, such as letters and numbers, drawn by a random set of people (i.e. samples from different people) of a given target group. Different target groups may be distinguished from each other by the age, gender and/or handedness of the sample givers in the groups.

The training data set is used to train the ANN during a training phase by pairing the input with expected output, while the test data set is used during a test phase to estimate how well the ANN has been trained and/or to verify that the trained ANN operates correctly. In this example, the data samples of the training data set comprise equal number of samples for different characters, i.e. equal number of samples from different people for letters a, b, c, . . . , numbers 0, 1 etc. The larger the training data set it, the more reliably the proposed method can correctly interpret the characters entered by any user. It is to be noted that there are only few ways to write a character correctly but many ways of writing it wrong. Furthermore, only correctly drawn characters are informative. For this reason, the training data set preferably comprises thousands of samples. As mentioned above, RNNs are particularly well suited for the proposed method, because they consider temporal aspects of the data and thus take into account the dynamics of writing. According to the present invention, the RNN is trained to solve the problem of identifying characters by using an approach that mimics human-beings. Hence, a model is trained to discriminate characters or to distinguish one character from other characters. Furthermore, knowledge is transferred from a character recognising model to a subsequent one that scores a given user's or person's handwriting. It is to be noted that in this example, the training phase considers the dynamics of writing when training the ANN. This means that the training takes into account the manner how the first set of characters are handwritten and the final appearance of the first set of characters.

The method continues in step 23, where the data processing device 7 collects analysis data, i.e. a first character is collected from a second set of n characters, which the user is requested to enter. This step may also include the data processing device 7 requesting the user to enter the second set of characters. The data processing device 7 may visually show the second set of characters to be reproduced by the user and/or an acoustic announcement may be given. The user is advantageously from the same target group as the sample givers used to train the ANN. In this example, the characters are drawn on the paper 5 placed on the sensitive surface of the data processing device 7. In this manner, the data processing device 7 is able to sense and interpret the characters. In this example, the set of n characters consists of the 26 letters of the English alphabet, i.e. letters a to z, and ten natural numbers, i.e. numbers 0 to 9. However, the teachings of the present invention are not limited to this particular set of characters. Different alphabets could be used instead, including Arabic, Greek, Latin, Cyrillic, Hebrew etc. The present method defines a separate class for each character of the set of characters. In other words, each character of the set of characters has its own class. These classes can in this example be referred to as a "class a", "class b", "class c", . . . "class 0", "class 1" etc. Furthermore, optionally an additional class is introduced for covering characters which cannot be classified to any of the other classes. This means that, if the proposed method is unable to identify with a given or predefined probability that a given character belongs to any class corresponding to the letters or digits, then it can be classified to the additional class. All these classes together form a set of classes, which in this example consists of 37 classes including 26 classes of letters, 10 classes of digits and one additional class.

Figure 4:
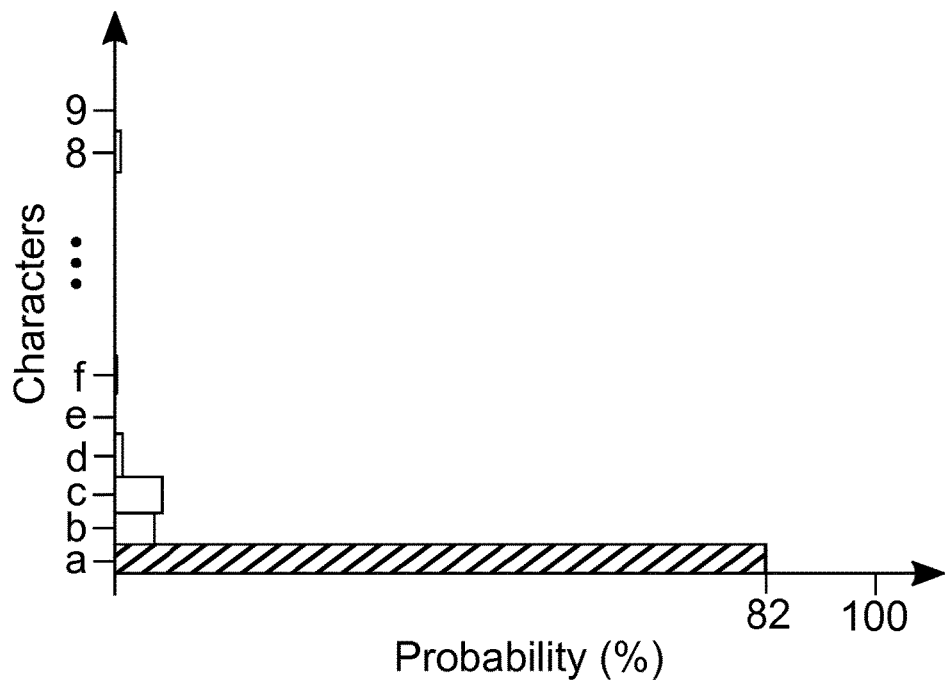
FIG. 4 is an example diagram graphically illustrating probability values computed by the data processing device for a character drawn by a user indicating what the likelihood is that the drawn character represents a particular character.

In step 25, the data processing device 7 determines for the character entered by the user its probability or likelihood of belonging to each of the classes of the set of classes (i.e. n+1 classes). In other words, in this example, the collected character is compared to every character in a third set of n characters to obtain n+1 probability values. It is to be noted that the additional probability value comes from the additional class. The characters in the third set of characters are the characters generated by the ANN as a response to the training phase. The characters in the first, second and third sets of characters may comprise the same characters, but their visual appearances are likely to differ between the sets to a certain extent. For example, if the first character entered is letter "a", then the probability of this letter belonging to "class a" may be for example 0.82 (as determined by the data processing device 7), while the probability of it belonging to "class b" is 0.018, "class c" 0.022 etc. These probabilities are graphically illustrated in the diagram of FIG. 4 for the "letter a". Once these probabilities are obtained for the first character, then the data processing device 7 determines what the probability is that the given character is interpreted correctly. In the example of the "letter a", the probability would be 0.82. This determination is possible, because the data processing device 7 knows which character the user is supposed to enter within a given time window. It is to be noted that steps 23 and 25 can run at least partially in parallel. In other words, as soon as the user has started entering the first character, the data processing device 7 may start calculating the probabilities in real-time or near real-time such that these probabilities may evolve before the first character is fully entered. The final probability values are thus obtained once the character has been completed.

The probability values are obtained by analysing the final trace or visual appearance or look of the character but also the manner it has been produced. In other words, x and y coordinates of the trace and a time coordinate are used in the analysis. Optionally, the recognising model may also take into account any one or a combination of the following aspects: a pressure on a writing surface caused by the writing instrument used to produce a respective character, a tilt angle of the writing instrument with respect to the writing surface, acceleration of the writing instrument, jerk of the writing instrument etc. When analysing the final trace of the collected character entered by the user, the recognising model may compare the trace to representative characters, character by character, generated by the ANN in response to the training of the ANN. This kind of comparison may be based on a distance related parameter between the trajectory of the collected character and a trajectory of any of the representative characters. A given representative character may be an average of the same characters calculated from the training data set.

In step 27, at least some of the probability values are saved in the memory 11. At least the probability value of correctly interpreting the collected character, referred to as a probability value of correct interpretation or character specific probability value, is saved but also the other probability values may be saved, especially if they are used later. In other words, in this step the probability that the collected character is correctly interpreted is determined. In this example, this is done by selecting from the probabilities calculated in the previous step the one which corresponds to the character drawn by the user. It is to be noted that the data processing device 7 knows which character the user is supposed to draw at a given time instant or within a given time window. In step 29, it is determined whether or not all the characters of the set of characters have been collected. If some characters are still missing, then the method continues in step 23 and another character is collected. For example, now after the "letter a", the user may be requested to handwrite the "letter b". If all the characters have been collected, then the method proceeds to step 31, where all the probability values of correct interpretation (in this example 37 values) for the set of characters are averaged to obtain an average value, referred to as a final score, for this particular user. This score may then be used to confirm the character recognition. A threshold value may be set so that if the final score is above this threshold, the character(s) can be confirmed to be correctly interpreted with a certain probability. The final score may also serve as an indicator how well the character(s) has/have been drawn by the user, i.e. the user's handwriting proficiency. The higher this score is, the better this user can handwrite or produce the requested characters.

It is to be noted that the above process may be modified for example so that in step 23, the user is requested to enter all the characters of the set of characters and then in parallel the probability values are calculated. In other words, while the user enters new characters, the above probabilities are calculated substantially simultaneously with the data collection process.

As explained in the example above, the recognising model's input consists of a single character or more specifically of a point-by-point trajectory of the character. The target is an index pointing to the class that the character belongs to or is believed to belong. This means that the recognising model treats the problem as a multiclass classification problem, which is preceded by the data collection procedure (during which data are collected). The users are requested to write a given character, and even if the ground truth is known, the model is let to make its own interpretation of the character and point out the most likely character the collected character represents. In doing so, the data processing device 7 determines for each character entered by the user its probability or likelihood of belonging to each of the classes of the set of classes. In the end, a discrepancy between the user's intentions and the model's answers is measured. Assuming that the model is able to discriminate properly drawn characters with great accuracy, high discrepancy between any drawn character and the stored model or sample characters means that the drawn character is not legible. As mentioned, each user writes or draws all the characters of the set of characters, and in parallel, the model predicts a probability for each character to be the requested one. All these user related probability values, i.e. the probability values of correct interpretation, are averaged, and this value is understood as a score or statistic that confirms the correct character recognition and/or evaluates the user's writing proficiency. In the above example, un unweighted average was used. However, a weighted average could be used instead. In other words, a subset of the characters of the entire set of characters (i.e. only some of the characters of the entire set of characters) could have a weighting factor whose value is different from one. This factor may depend for example on a discriminative value of a character, which may directly depend on a degree of difficulty to handwrite this particular character. Also, the importance or relative frequency of given characters in a specific alphabet could be used to appropriately emphasise (weigh) the probability values of correct interpretation.

Figure 5:
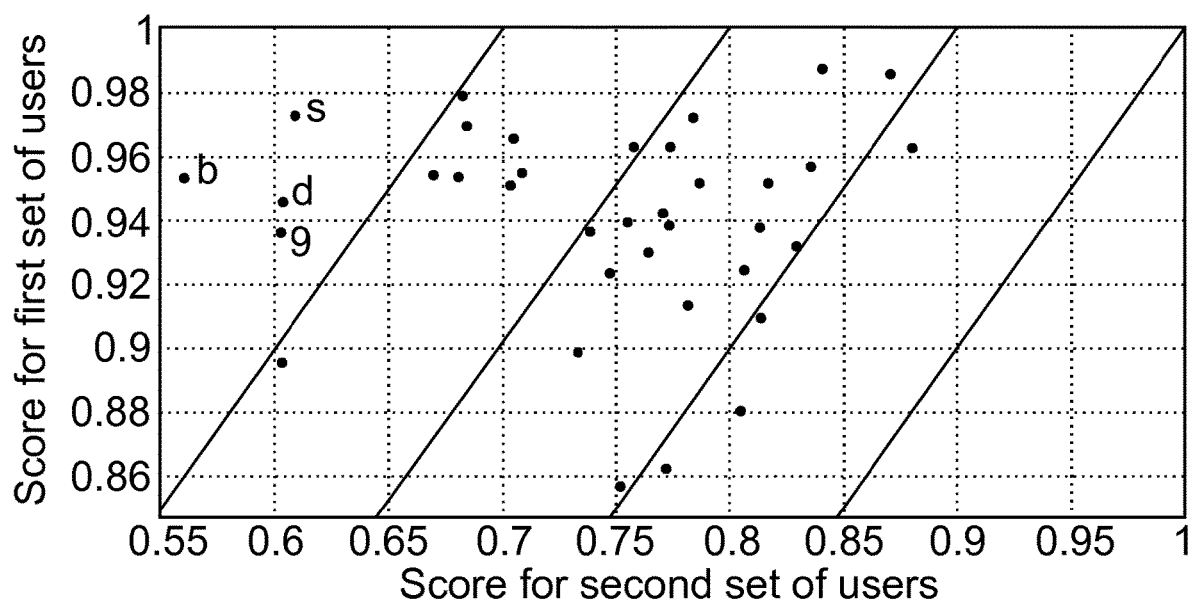
FIG. 5 is a diagram showing character specific scores for two different sets of users according to an example of the present invention.

In the above method, the user specific score was calculated or determined, but the method may be modified to obtain a character specific score. Thus, it is possible to calculate a character specific score for at least two different sets of users. For example, a first set of users could include only users who are known to write well, whereas a second set of users could include only users who are known to write badly. The final score can then be separately obtained or calculated for the first and second sets of users to identify the most discriminative characters, i.e. the ones that are particularly difficult to write for users with bad writing skills. For this reason, it would be helpful to identify these most discriminative characters. FIG. 5 illustrates a diagram showing character specific scores for the first and second sets of users according to an example. Each dot in the diagram represents a different character. Four inclined lines are drawn to divide the score space into five sections according to a character's discriminative value. The characters to the left of the far-left line are the most discriminative characters, i.e. these characters cause most difficulties for people who tend to write badly. On the other hand, characters close to the far-right line are approximately equally easy to write for everyone, i.e. these characters are not discriminative. In this example, as can be seen, characters "b", "s", "d" and "9" are discriminative characters according to the model used in this example. However, these characters may be at least partly different if the ANN is trained with a different training data set (e.g. sample givers having a different gender, age and/or handedness etc). The discriminative characters may be used to modify the above character analysis method. For example, higher weights may be assigned to discriminative characters or the users may be asked to write them more than once (the non-discriminative characters would be written once or not at all). The number of times a given character is written by the user may be directly proportional to the discriminative value or rating of the character. Alternatively, or in addition, only a subset of the set of characters may be used in the quality evaluation. The characters in the subset (e.g. 5 to 10 characters) could be the most discriminative ones. In this case, no analysis would be carried out for the remaining characters of the alphabet. This would be computationally less time consuming (and less challenging) and would thus save time.

To summarise, the above character analysis or discrimination procedure for a given user comprises at least some of the following steps:

1. The user writes the characters of the set of characters on the same computing device 7 as a response to a request issued to the user to handwrite the characters.

2. The recognising model, which is trained to discriminate characters, evaluates all the characters written by the user and determines the probability values. The probability value of correct interpretation (probability for the character to be the requested one) is determined for each one of the characters of the set of characters.

3. A final score is obtained as a weighted or unweighted average over the probability values of correct interpretation. The probability values of correct interpretation may be weighted according to the character's discriminative power. Thus, the proposed method may also be considered to be a method of determining a probability value for a correct character recognition. In this case the probability value (i.e. the final score) would be between 0 and 1.

4. The final score may then optionally be compared to a threshold value. A further action may then be taken depending on whether or not the final score is below the threshold value. The further action may for instance be a teaching or learning related action implemented by a teaching apparatus, which may comprise the data processing device 7.

As mentioned, the proposed method may be used to improve the user's (e.g. child's) handwriting. This may be implemented for instance so that the user becomes a teacher of a robot needing help to write better. More specifically, the robot is requested to write badly a given word or a combination of words on a tablet or any other suitable device. At the beginning these words may be chosen so that they comprise all or most of the characters of a given alphabet. The teacher (i.e. the user) then tries to correct the robot's writing by showing (a) better example(s) of the word(s) on the same device. While doing this, the teacher's handwriting is analysed with the method explained above. The robot is then requested to write words including characters which the teacher cannot write properly. In this manner, the method may be used to extract a handwriting profile of the teacher (as their proficiency for all letters of the alphabet can be revealed) and the system is then able to propose words with letters adapted to the skills of the teacher.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, instead of analysing individual characters separately, a combination of the characters could be analysed. The combination of the characters could form one or more words for example or one or more sentences. The invention may further relate to a computer program product comprising instructions for implementing at least some of the steps of the method when loaded and run on computing means of an electronic device.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for a data processing apparatus comprising an artificial neural network to confirm the recognition of one or more handwritten characters produced by a user, the method comprising:

training the artificial neural network with a training data set comprising a first set of characters, the training considering the manner how the first set of characters are handwritten and the appearance of the first set of characters;

collecting one or more handwritten characters of a second set of characters produced by the user in response to a request issued by the data processing apparatus to produce the one or more handwritten characters;

analysing the collected characters of the second set of characters by using the artificial neural network to obtain a first set of probability values comprising character specific probability values for the collected characters, each character specific probability value indicating the probability that the collected character has been correctly interpreted, wherein the analysis considers at least the manner how the collected characters are handwritten and the appearance of the collected characters to obtain the character specific probability values; and averaging the character specific probability values to obtain a final score for the user to allow confirming the recognition.

2. The method according to claim 1, wherein the averaging is carried out over unweighted character specific probability values.

3. The method according to claim 1, wherein the averaging is carried out over weighted character specific probability values.

4. The method according to claim 3, wherein the weighted character specific probability values are allocated a weighting factor depending on the difficulty to handwrite the respective character.

5. The method according to claim 1, wherein the manner is considered by analysing point by point a trajectory of the respective collected character.

6. The method according to claim 1, wherein the manner is considered by analysing at least one of the following: a pressure on a writing surface caused by a writing instrument used to produce the respective collected character, a tilt angle of the writing instrument with respect to the writing surface, acceleration of the writing instrument and jerk of the writing instrument.

7. The method according to claim 1, wherein the training data set is produced by sample givers of a training group defined by group parameters including age, gender and/or handedness of the sample givers, and wherein the user is fully or partially defined by said group parameters.

8. The method according to claim 1, wherein the method further comprises determining discriminative values of the characters of the second set of characters, and requesting the user to handwrite only a subset of the second set of characters, and wherein the subset comprises the most discriminative characters of the second set of characters.

9. The method according to claim 1, wherein one or more of the characters of the second set of characters are collected at least twice.

10. The method according to claim 1, wherein for obtaining the character specific probability values for the collected characters, the method further comprises determining for the respective collected character a second set of probability values comprising one probability value for each character of the first set of characters, each probability value indicating the probability that the collected character represents one of the characters of the first set of characters.

11. The method according to claim 1, wherein the method further comprises defining a threshold value of the final score and confirming the character recognition only if the final score is at least as high as the threshold value.

12. A data processing apparatus comprising an artificial neural network for confirming the recognition of one or more handwritten characters produced by a user, the apparatus being configured to perform operations comprising:

train the artificial neural network with a training data set comprising a first set of characters, the training is configured to consider the manner how the first set of characters are handwritten and the appearance of the first set of characters;

collect one or more handwritten characters of a second set of characters produced by the user in response to a request issued by the apparatus to produce the one or more handwritten characters;

analyse the collected characters of the second set of characters by using the artificial neural network to obtain a first set of probability values comprising character specific probability values for the collected characters, each character specific probability value indicating the probability that the collected character has been correctly interpreted, wherein the analysis is configured to consider at least the manner how the collected characters are handwritten and the appearance of the collected characters to obtain the character specific probability values; and average the character specific probability values to obtain a final score for the user to allow confirming the recognition.

13. The data processing apparatus according to claim 12, wherein the artificial neural network is a recurrent artificial neural network.

14. The data processing apparatus according to claim 12, wherein the training data set comprises equal number of different training characters.

15. The data processing apparatus according to claim 12, wherein the first and second sets of characters comprise letters of an alphabet and/or numerical digits.

* * * * *